US008571838B1

(12) United States Patent
McCloud

(10) Patent No.: US 8,571,838 B1
(45) Date of Patent: Oct. 29, 2013

(54) ANALYSIS OF FLUID FLOW OVER A SURFACE

(75) Inventor: Peter L. McCloud, Shoreacres, TX (US)

(73) Assignee: The Boeing Company, Chicago, IL (US)

( * ) Notice: Subject to any disclaimer, the term of this patent is extended or adjusted under 35 U.S.C. 154(b) by 614 days.

(21) Appl. No.: 12/850,229

(22) Filed: Aug. 4, 2010

(51) Int. Cl.
*G06F 17/50* (2006.01)

(52) U.S. Cl.
USPC ........ 703/2; 703/5; 165/41; 165/272; 52/80.1

(58) Field of Classification Search
USPC ............... 703/2, 5; 52/101, 80.1; 165/41, 272
See application file for complete search history.

(56) References Cited

U.S. PATENT DOCUMENTS

| 4,727,932 A * | 3/1988 | Mahefkey | 165/41 |
| 4,813,476 A * | 3/1989 | Mahefkey | 165/272 |
| 6,226,933 B1 * | 5/2001 | Nelson et al. | 52/101 |
| 6,519,901 B1 * | 2/2003 | Nelson et al. | 52/101 |
| 7,358,502 B1 * | 4/2008 | Appleby et al. | 250/370.14 |

OTHER PUBLICATIONS

Chamberlain, NASA/MSFC CHEM Modules: A Short Guide on How to Use CHEM Module Extensions Tetra Research Modules for CHEM 3-2-beta-x, Sep. 21, 2009, 26 pages, Princeton, IL.

* cited by examiner

*Primary Examiner* — Thai Phan
(74) *Attorney, Agent, or Firm* — Yee & Associates, P.C.

(57) ABSTRACT

A method, apparatus, and computer program product for modeling heat radiated by a structure. The flow of a fluid over a surface of a model of the structure is simulated. The surface has a plurality of surface elements. Heat radiated by the plurality of surface elements in response to the fluid flowing over the surface of the model of the structure is identified. An effect of heat radiated by at least a portion of the plurality of surface elements on each other is identified. A model of the heat radiated by the structure is created using the heat radiated by the plurality of surface elements and the effect of the heat radiated by at least a portion of the plurality of surface elements on each other.

34 Claims, 10 Drawing Sheets

ANALYSIS OF FLUID FLOW OVER A SURFACE

GOVERNMENT LICENSE RIGHTS

This invention was made with Government support under Boeing subcontract 6000132079 awarded by United Space Alliance under prime contract NNJ06VA01C awarded by NASA. The Government has certain rights in this invention.

BACKGROUND INFORMATION

1. Field

The present disclosure relates generally to simulating models for structures and, in particular, to simulating models for structures to analyze performance information for the structures. Still more particularly, the present disclosure relates to analyzing the flow of fluid over structures using simulations.

2. Background

In designing vehicles, models of the vehicles are created and used in simulations. These simulations are used to obtain information about the vehicles. These vehicles may include, for example, aircraft, spacecraft, ground vehicles, and other types of vehicles. In particular, a model of an aircraft may be simulated to obtain performance information for the aircraft. This performance information may include, for example, without limitation, loads carried by different parts of a structure, fuel efficiency, engine power, heat generated by airflow over the surface of the aircraft, effects based on speed of the aircraft, and/or other suitable types of information.

This information may then be analyzed to determine whether the aircraft meets design specifications or other criteria. This analysis may then be used to determine whether to make changes to the design of the aircraft.

Different types of programs are used to run simulations of models for a vehicle. For example, a number of different programs are present for obtaining information about the flow of fluid over a surface of a model of a structure. These programs use computational fluid dynamics (CFD) to obtain this information about the flow of fluid. Computational fluid dynamics is a branch of fluid mechanics that uses numerical methods and algorithms to solve and analyze problems that involve the flow of fluid. These currently available programs for analyzing the flow of fluid over a surface may not provide the preciseness desired.

Therefore, it would be advantageous to have a method and apparatus that takes into account at least some of the issues discussed above, as well as other possible issues.

SUMMARY

In one advantageous embodiment, a method is provided for modeling heat radiated by a structure. A flow of a fluid over a surface of a model of the structure is simulated. The surface has a plurality of surface elements. Heat radiated by the plurality of surface elements in response to the fluid flowing over the surface of the model of the structure is identified. An effect of heat radiated by at least a portion of the plurality of surface elements on each other is identified. A model of the heat radiated by the structure is created using the heat radiated by the plurality of surface elements and the effect of the heat radiated by at least a portion of the plurality of surface elements on each other.

In another advantageous embodiment, an apparatus comprises a processor unit, a memory, a storage device, first program code, second program code, third program code, and fourth program code. The first program code is for simulating the flow of a fluid over the surface of a model of a vehicle. The surface has a plurality of surface elements. The second program code is for identifying heat radiated by the plurality of surface elements in response to the fluid flowing over the surface of the model. The third program code is for identifying an effect of heat radiated by a portion of the plurality of surface elements on each other. The fourth program code is for creating a model of the heat radiated by the vehicle using the heat radiated by the plurality of surface elements and by the effect of the heat radiated by a portion of the plurality of surface elements on each other. The first program code, the second program code, the third program code, and the fourth program code are stored on the storage device for processing by the processor unit via the memory.

In yet another advantageous embodiment, a computer program product comprises a computer readable storage medium and program code, stored on the computer readable storage medium. Program code is present for simulating a flow of a fluid over a surface of a model of a structure. The surface has a plurality of surface elements. Program code is present for identifying heat radiated by the plurality of surface elements in response to the fluid flowing over the surface of the model of the structure. Program code is present for identifying an effect of heat radiated by at least a portion of the plurality of surface elements on each other. Program code is present for creating a model of the heat radiated by the structure using the heat radiated by the plurality of surface elements and the effect of the heat radiated by at least a portion of the plurality of surface elements on each other.

In still another advantageous embodiment, a method for manufacturing a thermal protection system is present. A flow of a fluid over a surface of a model of a structure is simulated. The surface has a plurality of surface elements, and the structure comprises the thermal protection system. Heat radiated by the plurality of surface elements in response to the fluid flowing over the surface of the model of the structure is identified. An effect of the heat radiated by at least a portion of the plurality of surface elements on each other is identified. A model of the heat radiated by the structure is created using the heat radiated by the plurality of surface elements and the effect of the heat radiated by the at least a portion of the plurality of surface elements on the each other. A determination is made as to whether the model of the thermal protection system has a desired response using the model of the heat radiated by the structure. Responsive to a determination that the model of the thermal protection system has the desired response, the thermal protection system is manufactured from the model of the structure.

In another advantageous embodiment, an apparatus for identifying maintenance for a thermal protection system is present. The apparatus comprises a processor unit configured to simulate a flow of a fluid over a surface of a model of a vehicle with the thermal protection system, wherein the surface has a plurality of surface elements. The processor unit is configured to identify heat radiated by the plurality of surface elements in response to the fluid flowing over the surface of the model and to identify an effect of the heat radiated by a portion of the plurality of surface elements on each other. The processor unit is also configured to create a model of the heat radiated by the vehicle using the heat radiated by the plurality of surface elements and by the effect of the heat radiated by the portion of the plurality of surface elements on the each other. A determination is made by the processor unit as to whether the model of the heat radiated by the thermal protection system has a desired response. The processor unit is configured to identify maintenance for the thermal protection system if the model does not have the desired response.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
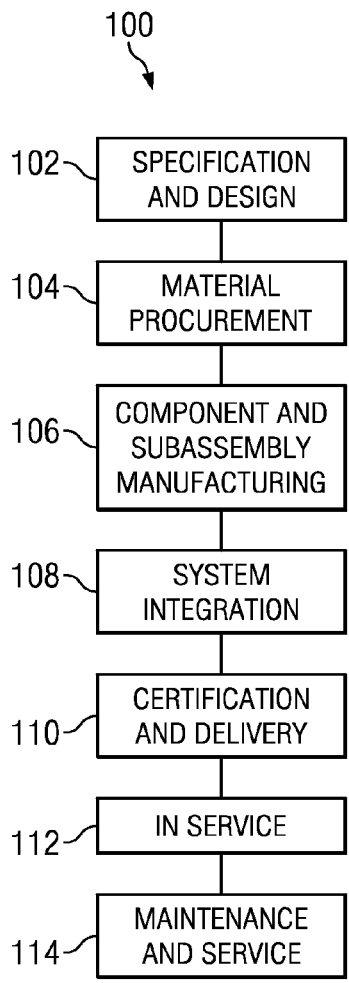
FIG. 1 is an illustration of an aircraft manufacturing and service method in accordance with an advantageous embodiment.
Figure 2:
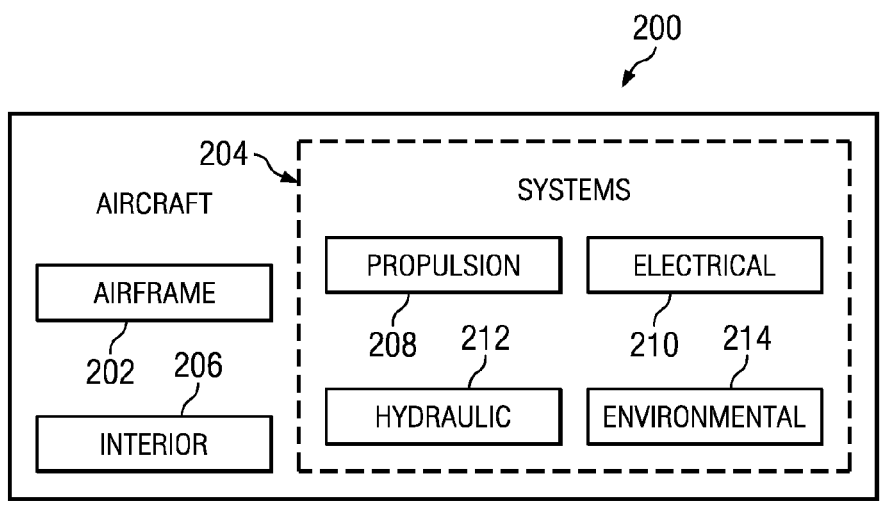
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of considerations. For example, the different advantageous embodiments recognize and take into account that currently used simulation processes do not take into account certain factors that may be desired for designing structures, such as aircraft and parts for aircraft.

For example, the different advantageous embodiments recognize and take into account that currently used simulation programs do not take into account all of the factors that contribute to the heat generated by the flow of fluid over a surface. In particular, currently available programs may make assumptions about the flow of fluid over a surface and the surface that do not apply to all types of situations. With these types of assumptions, the results from the analysis of the flow of fluid using the simulations may not be as accurate as desired.

As one illustrative example, the different advantageous embodiments recognize and take into account that currently used simulation processes assume that the temperature of the environment around a structure is absolute zero. These currently used simulation processes do not take into account that the temperature of the environment around the structure may be greater than absolute zero. For example, when simulating a model of an aircraft being tested in a wind tunnel, the currently used simulation processes do not take into account that the temperature in the wind tunnel is greater than absolute zero and closer to room temperature.

Additionally, the different advantageous embodiments recognize and take into account that currently used simulation processes do not take into account that different portions of surfaces on a structure may exchange heat with each other. In other words, heat radiated by one portion of the structure may influence or affect the heat radiated by another portion of the structure. The different advantageous embodiments recognize and take into account that when heat is radiated by the structure, the heat may radiate from a particular portion of a structure to influence the heat that occurs at another portion of the structure.

As a result, currently used simulation processes may not provide an analysis of the flow of fluid over a structure with the desired accuracy and preciseness.

Thus, the different advantageous embodiments provide a method and apparatus for modeling heat radiated by a structure. In the different advantageous embodiments, a flow of a fluid over a surface of a model of a structure is simulated. The surface of the structure has a plurality of surface elements. The heat radiated by the plurality of surface elements in response to the fluid flowing over the surface model is identified. Additionally, an effect of the heat radiated by at least a portion of the plurality of surface elements on each other is identified. A model of the heat generated by the structures is created using the heat radiated by the plurality of surface elements and by the effect of the heat radiated by a portion of the plurality of surface elements on each other.

Figure 3:
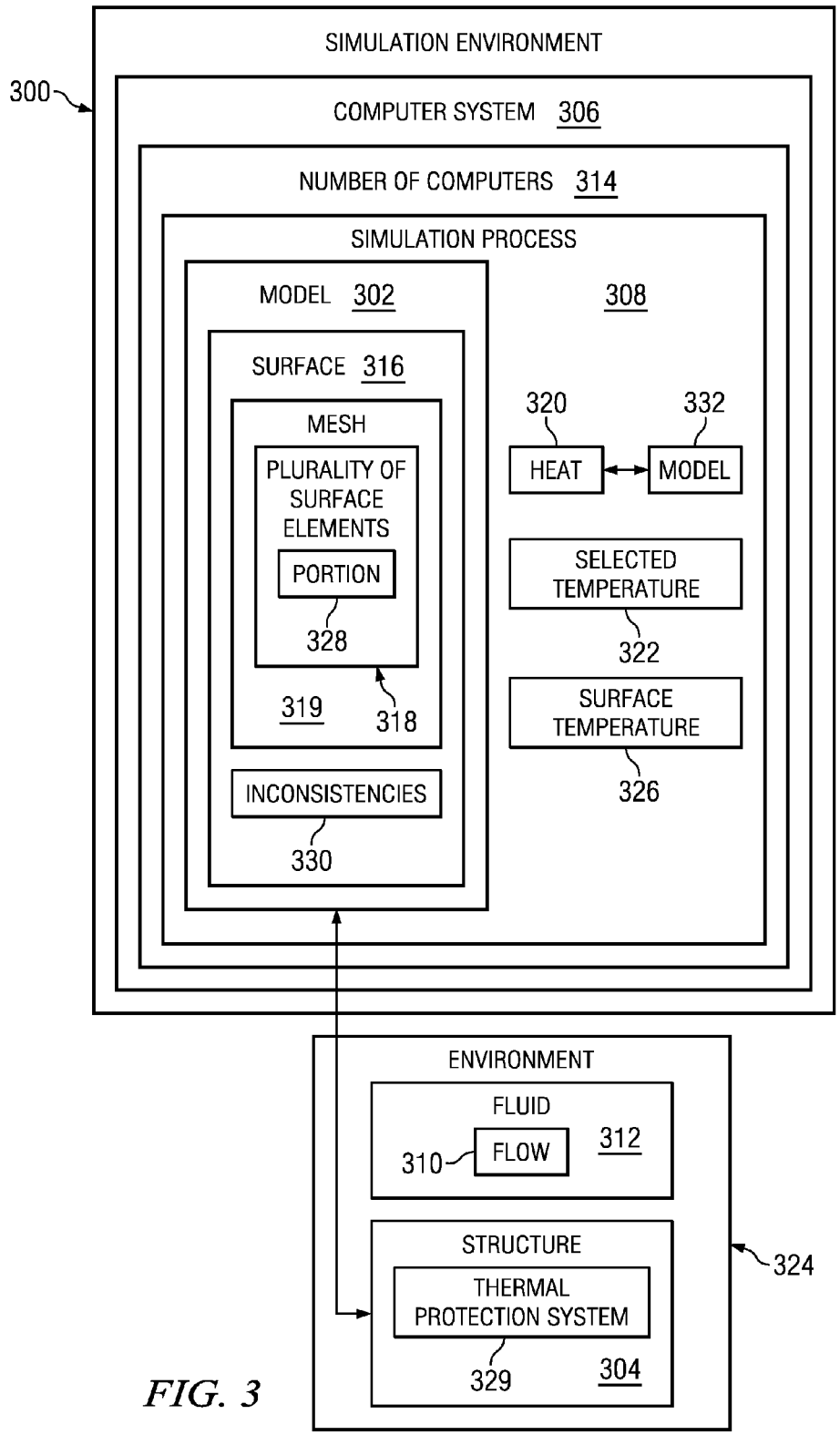
FIG. 3 is an illustration of a simulation environment in accordance with an advantageous embodiment.

With reference now to FIG. 3, an illustration of a simulation environment is depicted in accordance with an advantageous embodiment. Simulation environment 300 may be used to simulate model 302 of structure 304. In these illustrative examples, structure 304 may be, for example, without limitation, aircraft 200 in FIG. 2. In other illustrative examples, structure 304 may be a part or portion of aircraft 200 in FIG. 2.

Simulation environment 300 may be used to simulate model 302 of structure 304 during aircraft manufacturing and service method 100 in FIG. 1. For example, model 302 of structure 304 may be simulated during specification and design 102 in FIG. 1. Model 302 may also be simulated during in service 112, maintenance and service 114, and/or other suitable processes in aircraft manufacturing and service method 100 in FIG. 1.

In this illustrative example, model 302 is a data file containing data about structure 304. Model 302 may be presented on hardware in computer system 306. This hardware in computer system 306 may be a display device, such as a liquid crystal display. For example, a visual representation of model 302 may be presented on the display device. Computer system 306 runs simulation process 308 to simulate flow 310 of fluid 312 over structure 304. In these illustrative examples, the simulation of flow 310 of fluid 312 over structure 304 is made using model 302 of structure 304.

Computer system 306 comprises number of computers 314 in these illustrative examples. Number of computers 314 may be in communication with each other over a network.

As depicted, model 302 of structure 304 has surface 316. Surface 316 is comprised of plurality of surface elements 318. In other words, plurality of surface elements 318 makes up or forms surface 316 for model 302 in these examples.

In these illustrative examples, plurality of surface elements 318 comprises mesh 319 for surface 316 for model 302. Mesh 319, for example, may be a two-dimensional mesh formed from polygons of substantially the same size and/or shape or a three-dimensional mesh formed from polyhedrons of substantially the same size and/or shape. In other words, each surface element in plurality of surface elements 318 is a polygon in a two-dimensional mesh. In a three-dimensional mesh, each surface element is a polyhedron. In some illustrative examples, the different polygons or different polyhedrons may have different sizes and/or shapes, depending on the implementation.

In other illustrative examples, each surface element in plurality of surface elements 318 is a part of the surface of structure 304. In these examples, polygons and polyhedrons may form a single surface element in plurality of surface elements 318.

For example, plurality of surface elements 318 includes tiles, panels, portions of a skin, and/or other parts of structure 304 that form surface 316. In these illustrative examples, plurality of surface elements 318 may have different shapes and/or sizes. In still other illustrative examples, plurality of surface elements 318 may be defined by user input.

Simulation process 308 simulates flow 310 of fluid 312 over surface 316 of model 302 for structure 304. In these examples, flow 310 of fluid 312 is over plurality of surface elements 318. Fluid 312 may be, for example, air, water, and/or some other suitable liquid. In simulating flow 310 of fluid 312 over surface 316, simulation process 308 identifies heat 320, which is radiated by structure 304.

Heat 320, radiated by structure 304, is heat that travels away from the surface of structure 304. This heat does not include heat that is absorbed into structure 304.

Heat 320 may be heat radiated by plurality of surface elements 318 in response to fluid 312 over surface 316 for model 302. For example, heat 320 may include the heat radiated by plurality of surface elements 318 in response to the friction produced by fluid 312 flowing over surface 316.

Further, heat 320 may include the heat radiated by plurality of surface elements 318 in response to compression of fluid 312 flowing over structure 304. Compression of fluid 312 may occur at different speeds, such as, for example, supersonic and/or hypersonic speeds. Supersonic speeds are speeds greater than the speed of sound, such as Mach 1 or greater. Hypersonic speeds are speeds greater than about five times the speed of sound, such as Mach 5 or greater.

In identifying heat 320, simulation process 308 takes into account selected temperature 322. Selected temperature 322 is a temperature for environment 324 around structure 304 in which fluid 312 flows. In particular, selected temperature 322 may be the temperature of environment 324 at a selected distance from surface 316. Using selected temperature 322 to identify heat 320 allows simulation process 308 to take into account different environments for environment 324 other than space. For example, selected temperature 322 may be the temperature inside a wind tunnel.

Additionally, simulation process 308 also identifies surface temperature 326. Surface temperature 326 is the temperature of surface 316 in response to fluid 312 flowing over surface 316. In these examples, surface temperature 326 may include different temperatures for different portions of surface 316. Surface temperature 326 and heat 320 are related to each other. In other words, surface temperature 326 may be identified using heat 320, and heat 320 may be identified using surface temperature 326.

Further, simulation process 308 also identifies an effect of heat 320 radiated by at least a portion of plurality of surface elements 318 on each other. For example, simulation process 308 identifies an exchange of heat 320 between portion 328 of plurality of surface elements 318 with each other. Portion 328 includes some, all, or none of plurality of surface elements 318 in these examples.

As one illustrative examples, portion 328 of plurality of surface elements 318 includes a number of surface elements with an orientation different from other surface elements in plurality of surface elements 318. This difference in orientation may indicate that surface 316 is not substantially even and/or substantially smooth in the areas of portion 328 of plurality of surface elements 318.

For example, inconsistencies 330 may cause the difference in orientation for portion 328 of plurality of surface elements 318. Inconsistencies 330 may take the form of, for example, a missing portion of the surface element, a crack in the surface element, a seam in the surface element, a seam between surface elements, an uneven portion of the surface element, or some other suitable type of inconsistency.

Inconsistencies 330 have an effect of surface elements in portion 328 of plurality of surface elements 318 exchanging heat with each other. For example, a surface element may transfer heat generated in response to flow 310 of fluid 312 over surface 316 to another surface element having an inconsistency.

In these illustrative examples, simulation process 308 uses heat 320 and the effect of heat 320 radiated by portion 328 of plurality of surface elements 318 on each other to create model 332 of heat 320 radiated by structure 304. In other words, model 332 includes heat 320 generated by plurality of surface elements 318 and the effect of heat 320 generated by portion 328 of plurality of surface elements 318 on each other. Further, model 332 includes surface temperature 326.

In these illustrative examples, structure 304 may include thermal protection system 329. As a result, model 332 generated by simulation process 308 may be analyzed to determine whether a desired response has occurred in model 332. In other words, heat 320 in different locations of surface 316 may be examined to determine whether heat 320 radiates at desired levels. These surfaces may be locations where thermal protection system 329 is located or designed to limit heat 320. In other words, locations for thermal protection system 329 is located may radiate more heat to prevent heat 320 from being absorbed by other portions of structure 304. In yet other examples, thermal protection system 329 may absorb heat 320 such that the radiation of heat 320 decreases.

If model 332 has a desired response, then structure 304 is manufactured using model 302 of structure 304. If model 332 does not provide a desired response, then model 302 may be changed to form a new model with the new model being run by simulation process 308.

In this manner, the amount of time and expense needed to design and manufacture thermal protection system 329 for structure 304 may be reduced. Through the use of model 302 and simulation process 308 to generate model 332, the different responses may be used to determine whether changes are needed before actually manufacturing thermal protection system 329 for testing. As a result, a reduction in the number of times needed to test structure 304 may reduce the time and effort needed to make prototypes and test those prototypes. In these illustrative examples, a desired response may be whether the amount of heat 320 radiated in different locations of surface 316 meets desired levels.

The illustration of simulation environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments.

Also, the blocks are presented to illustrate some functional components. One or more of these blocks may be combined and/or divided into different blocks when implemented in different advantageous embodiments.

For example, although the illustrative examples are described with respect to structure 304 taking the form of aircraft 200 in FIG. 2 or a part or portion of aircraft 200, the different advantageous embodiments may be applied to other types of structures. Structure 304 may be, for example, without limitation, a spacecraft, an automobile, a rocket, a missile, or some other suitable type of structure.

Figure 4:
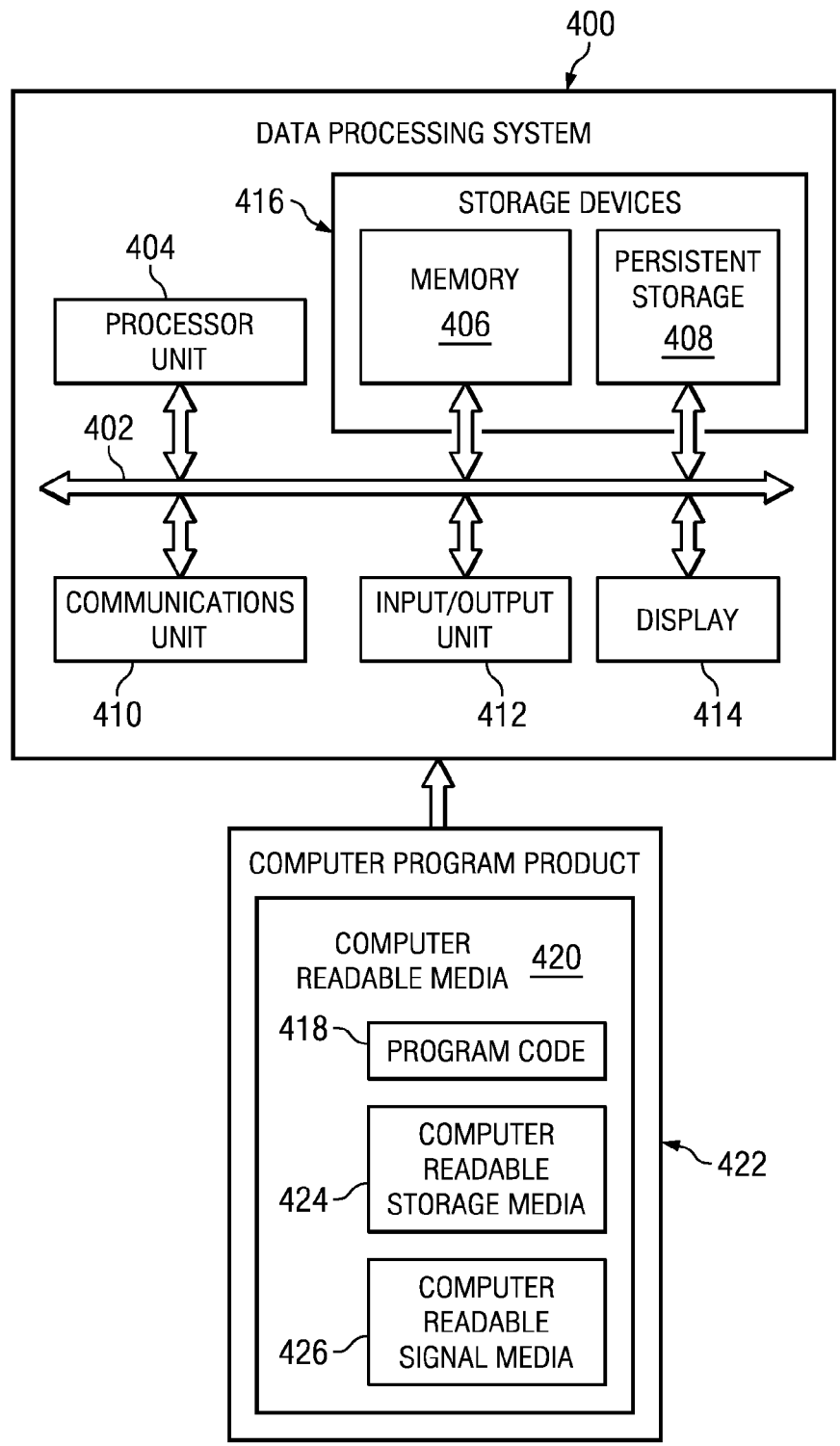
FIG. 4 is an illustration of a data processing system in accordance with an advantageous embodiment.

Turning now to FIG. 4, an illustration of a data processing system is depicted in accordance with an advantageous embodiment. In this illustrative example, data processing system 400 is an example of one implementation for a computer in number of computers 314 in computer system 306 in FIG. 3.

As depicted, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
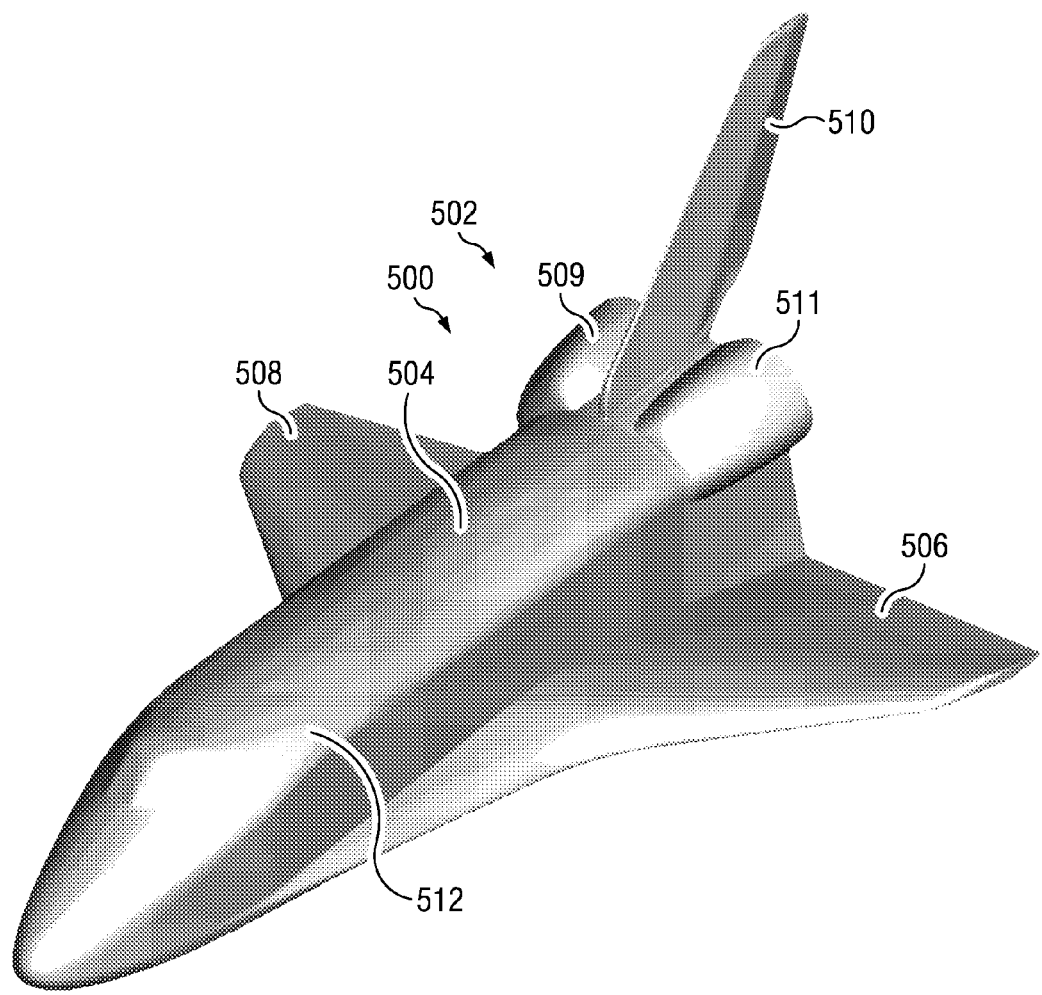
FIG. 5 is an illustration of a perspective view of a model of a space shuttle in accordance with an advantageous embodiment.

With reference now to FIG. 5, an illustration of a perspective view of a model of a space shuttle is depicted in accordance with an advantageous embodiment. In this illustrative example, model 500 is an example of one implementation for model 302 in FIG. 3. In particular, model 500 is a visual representation of model 302 in FIG. 3.

As depicted in this example, model 500 is for a vehicle in the form of space shuttle 502. Space shuttle 502 is an example of one implementation for structure 304 in FIG. 3. In this illustrative example, model 500 of space shuttle 502 has fuselage 504, wing 506, wing 508, tail 510, engine 509, and engine 511. Model 500 has surface 512 of space shuttle 502. Model 500 of space shuttle 502 may be simulated to obtain performance information for space shuttle 502. For example, model 500 may be simulated to obtain information about airflow over surface 512 of model 500 of space shuttle 502.

Figure 6:
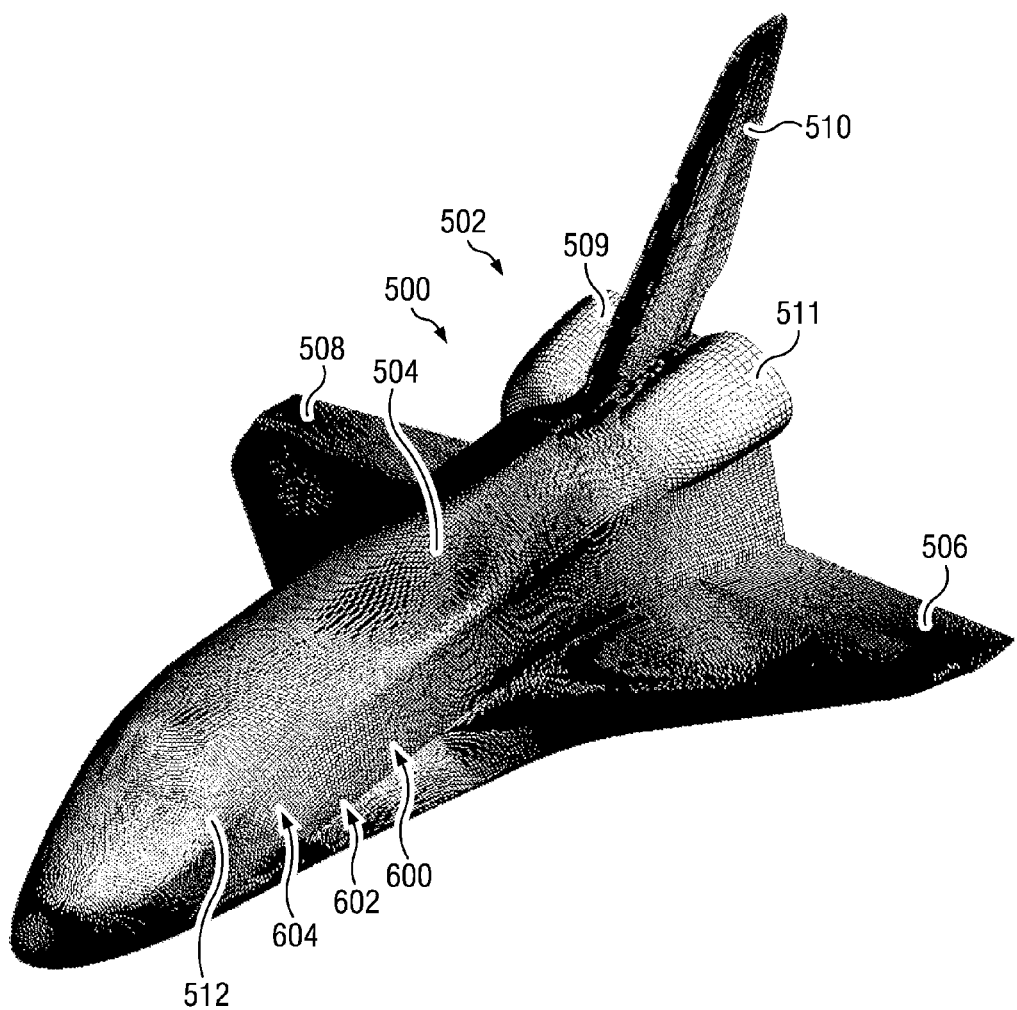
FIG. 6 is an illustration of a top view of a model of a space shuttle in accordance with an advantageous embodiment.

With reference now to FIG. 6, an illustration of a perspective view of a model of a space shuttle is depicted in accordance with an advantageous embodiment. In this illustrative example, mesh 600 has been created for surface 512 of model 500 of space shuttle 502 in FIG. 5. Mesh 600 is comprised of polygons 602. Polygons 602 form surface elements 604 for surface 512. As depicted in this example, each polygon is a quadrilateral in this illustrative example.

In this illustrative example, multiple surface elements in surface elements 604 may form a surface for a part of space shuttle 502. As one illustrative example, a tile in the skin for space shuttle 502 may include 100 surface elements. Of these 100 surface elements, 30 surface elements may have inconsistencies.

For example, a portion of the tile may be missing in the regions of these 30 surface elements. In another example, these 30 surface elements may include a seam between the tile and another tile. The inconsistencies in the 30 surface elements may affect the exchange of heat between at least a portion of the 100 surface elements forming the tile.

Figure 7:
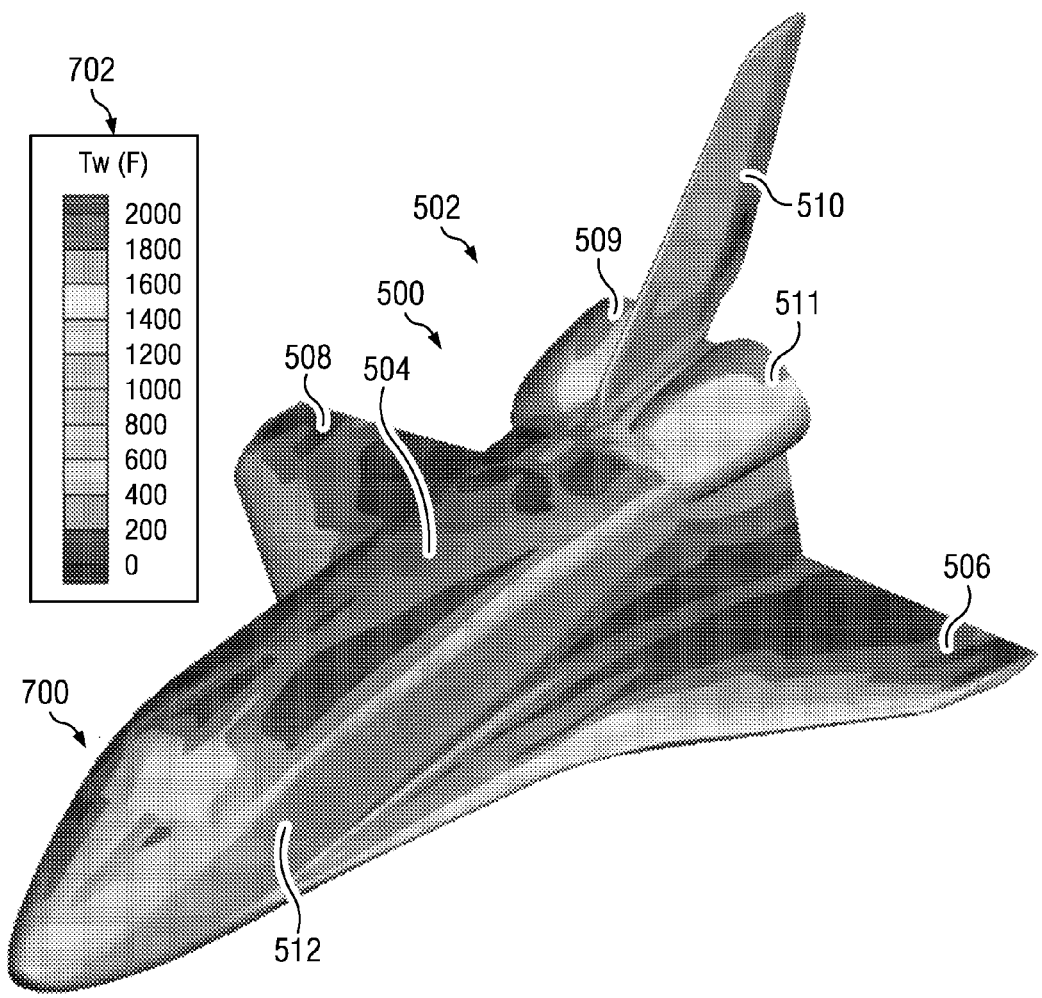
FIG. 7 is an illustration of a top view of a model of heat radiated by a space shuttle in accordance with an advantageous embodiment.

With reference now to FIG. 7, an illustration of a perspective view of heat radiated by a space shuttle is depicted in accordance with an advantageous embodiment. In this illustrative example, model 700 is a model of the heat radiated by surface 512 of model 500 of space shuttle 502 in FIG. 5 in response to airflow over surface 512. As depicted, model 700 identifies temperature ranges 702 for the heat radiated by different portions of surface 512 of model 500 of space shuttle 502.

Figure 8:
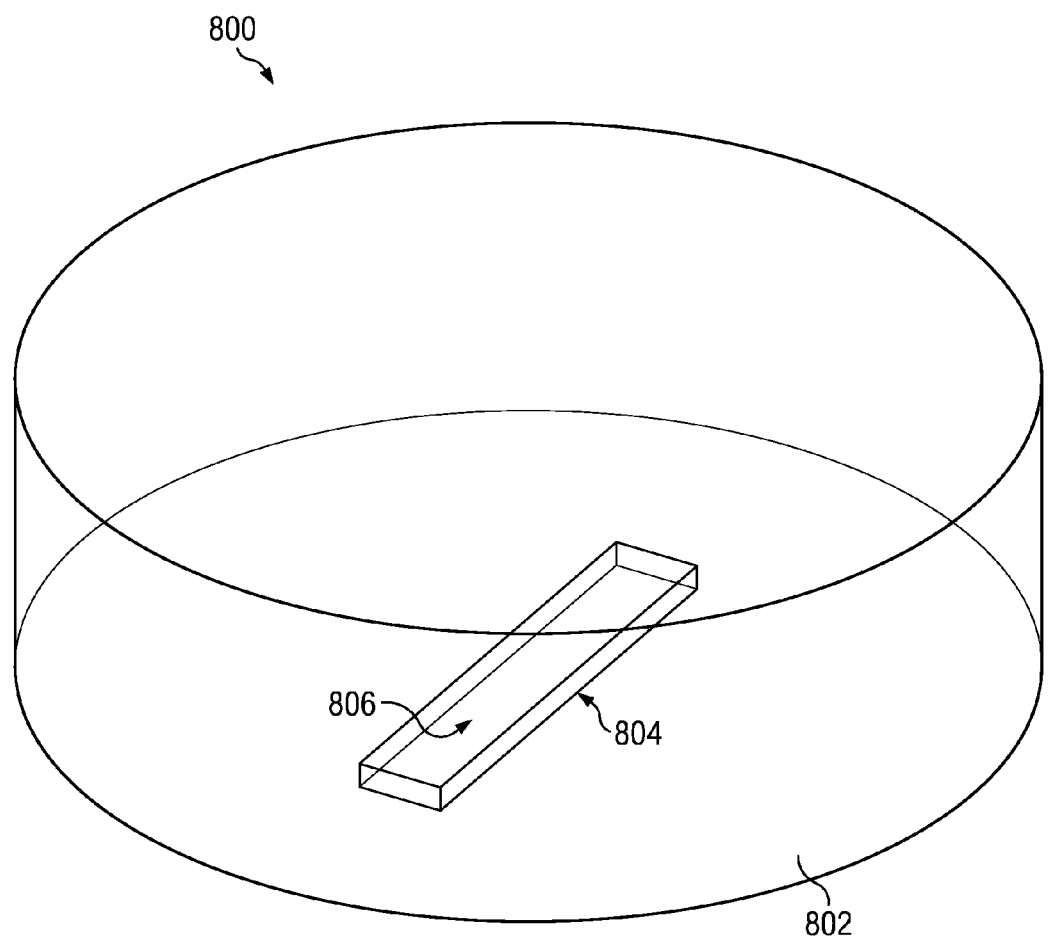
FIG. 8 is an illustration of a model of a portion of a space shuttle in accordance with an advantageous embodiment.

With reference now to FIG. 8, an illustration of a model of a portion of a space shuttle is depicted in accordance with an advantageous embodiment. In this illustrative example, model 800 is a portion of model 500 of space shuttle 502 in FIG. 5. Model 800 is for a tile in the skin of space shuttle 502 in this illustrative example.

As depicted, model 800 has surface 802. Inconsistency 804 is present in surface 802 in this illustrative example. Inconsistency 804 is a missing portion of surface 802 in this illustrative example. In this illustrative example, fluid may flow over surface 802 in the direction of arrow 806.

Figure 9:
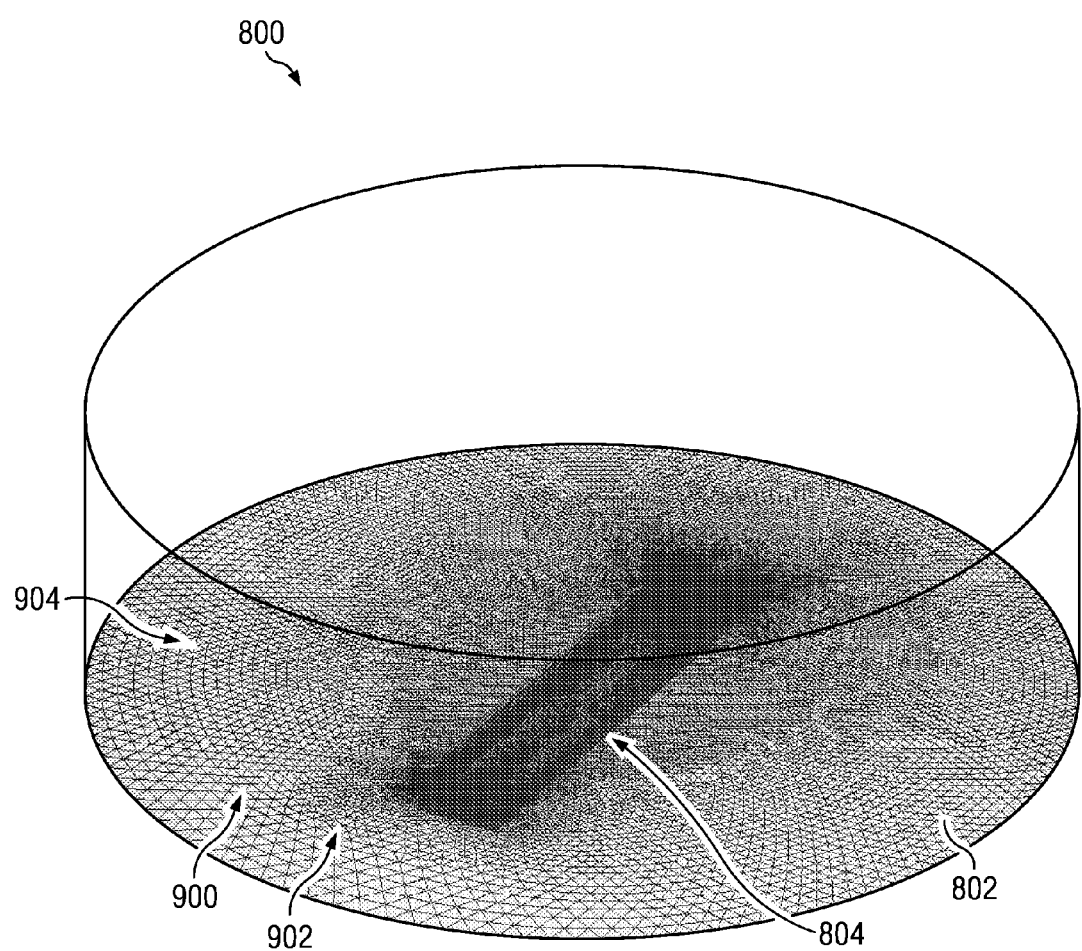
FIG. 9 is an illustration of a model of a portion of a space shuttle in accordance with an advantageous embodiment.

With reference now to FIG. 9, an illustration of a model of a portion of a space shuttle is depicted in accordance with an advantageous embodiment. In this illustrative example, mesh 900 has been formed for surface 802 of model 800 in FIG. 8. As depicted, mesh 900 is comprised of triangles 902. Each of triangles 902 is a surface element in surface elements 904 for surface 802.

In this illustrative example, simulation process 308 in FIG. 3 may be used to identify the heat radiated by surface 802 of model 800 in response to the flow of air over surface 802. In particular, simulation process 308 in FIG. 3 may be used to identify the heat radiated by surface elements 904.

Further, simulation process 308 may also be used to identify the effect of the heat radiated by at least a portion of surface elements 904 on each other. For example, at least a portion of surface elements 904 may influence each other. More specifically, at least a portion of surface elements 904 may exchange heat with each other. As one illustrative example, one surface element may transfer heat to another surface element. This portion of surface elements 904 includes the surface elements with inconsistency 804.

The heat exchanged between a first surface element and a second surface element is identified as follows:

$$q_{ij}=F_{ij}*\text{emissivity}*\sigma*(T_{firstelement}^4-T_{secondelement}^4),$$

where $q_{ij}$ is the heat exchanged between the first surface element and the second surface element, $F_{ij}$ is a percentage of an area of the second surface element affected by the heat from the first surface element, $\sigma$ is Boltzmann's constant, $T_{firstelement}$ is a temperature of the first surface element, and $T_{secondelement}$ is the temperature for the second surface element. Emissivity is the relative ability of a surface to emit heat in the form of radiation.

The heat radiated by the environment around surface 802 of model 800 is identified as follows:

$$q_{background}=(1-\Sigma F_{ij})*\text{emissivity}*\sigma*(T_{wall}^4-\text{selectedTemp}^4),$$

where $q_{background}$ is the heat radiated by the environment, $T_{wall}$ is the selected temperature for the environment around surface 802 of model 800, and selectedTemp is the temperature of surface 802 of model 800.

Using these two equations, simulation process 308 in FIG. 3 identifies the heat radiated by surface 802 of model 800 as follows:

$$Q=\Sigma q_{ij}+q_{background},$$

where Q is the heat radiated by surface 802 of model 800.

Simulation process 308 may use the information about the heat radiated by surface 802 of model 800 to create a model, such as model 332 in FIG. 3, of the heat generated by surface 802 of model 800. As a result, by using a similar process to obtain heat information for other portions of surface 512 of space shuttle 502 in FIG. 5, simulation process 308 may be used to create a model of the heat radiated by space shuttle 502.

In some illustrative examples, simulation process 308 may assume that the surface elements in surface elements 904 do not influence each other. In these examples, the heat radiated by a surface element in surface elements 904 is identified as follows:

$$\dot{q}=\text{emissivity}*\sigma*(T_{wall}^4-\text{selectedTemp}^4).$$

Figure 10:
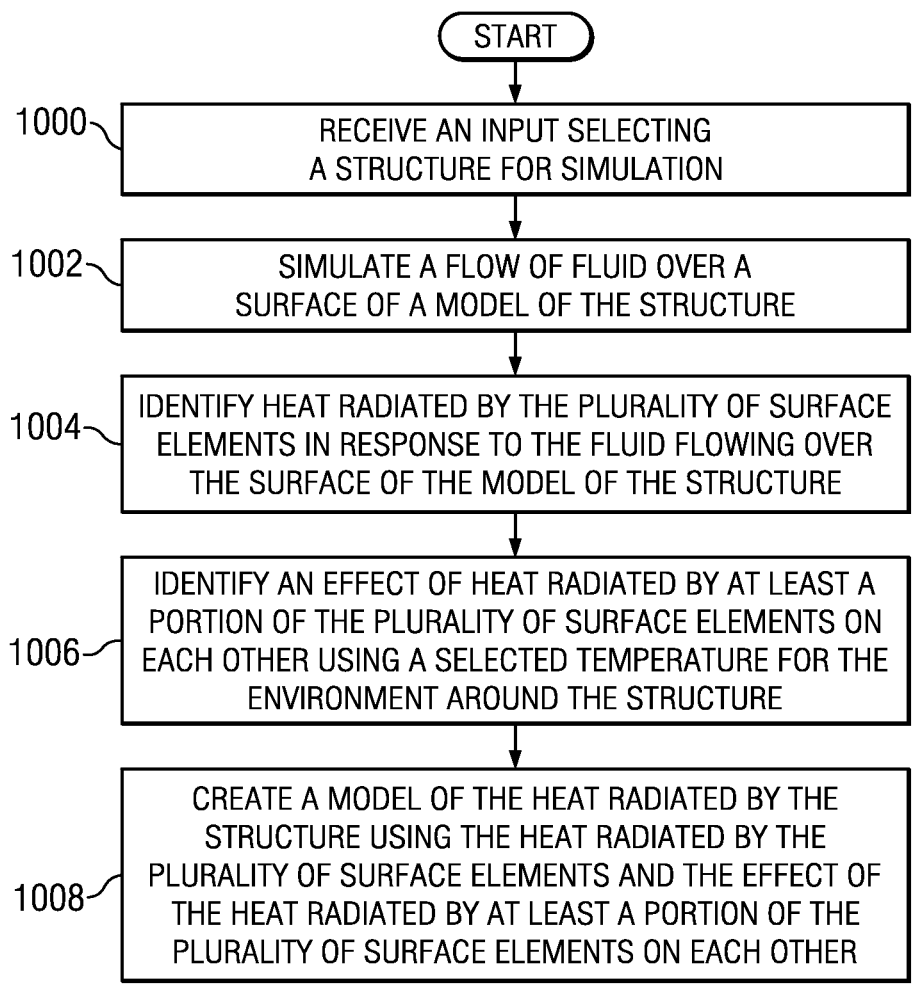
FIG. 10 is an illustration of a flowchart of a process for identifying heat radiated by a structure in accordance with an advantageous embodiment.

With reference now to FIG. 10, an illustration of a flowchart of a process for identifying heat radiated by a structure is depicted in accordance with an advantageous embodiment. The process implemented in FIG. 10 may be implemented in simulation environment 300 using simulation process 308 in FIG. 3.

The process receives an input selecting a structure for simulation (operation 1000). The input may be a file containing a model of the structure, a name of a model, and/or some other suitable input. The structure may be, for example, a vehicle, a portion of a vehicle, or some other suitable type of structure. The selection in operation 1000 may take a number of different forms. For example, the selection may be the name of a file containing a model of the structure, a user input selecting a portion of the model in the file, or some other suitable type of selection.

Thereafter, the process simulates a flow of fluid over a surface of a model of the structure (operation 1002). The surface has a plurality of surface elements. The process then identifies heat radiated by the plurality of surface elements in response to the fluid flowing over the surface of the model of the structure (operation 1004).

In operation 1004, the influence of one surface element on another surface element is identified. For example, the amount of heat transferred from one surface element to another surface element is identified in operation 1004.

Further, the process identifies an effect of the heat radiated by at least a portion of the plurality of surface elements on each other using a selected temperature for the environment around the structure (operation 1006). The selected temperature is a temperature of the environment around the structure at a selected distance from the surface of the structure in this illustrative example.

Thereafter, the process creates a model of the heat radiated by the structure using the heat radiated by the plurality of surface elements and the effect of the heat radiated by at least a portion of the plurality of surface elements on each other (operation 1008), with the process terminating thereafter.

Figure 11:
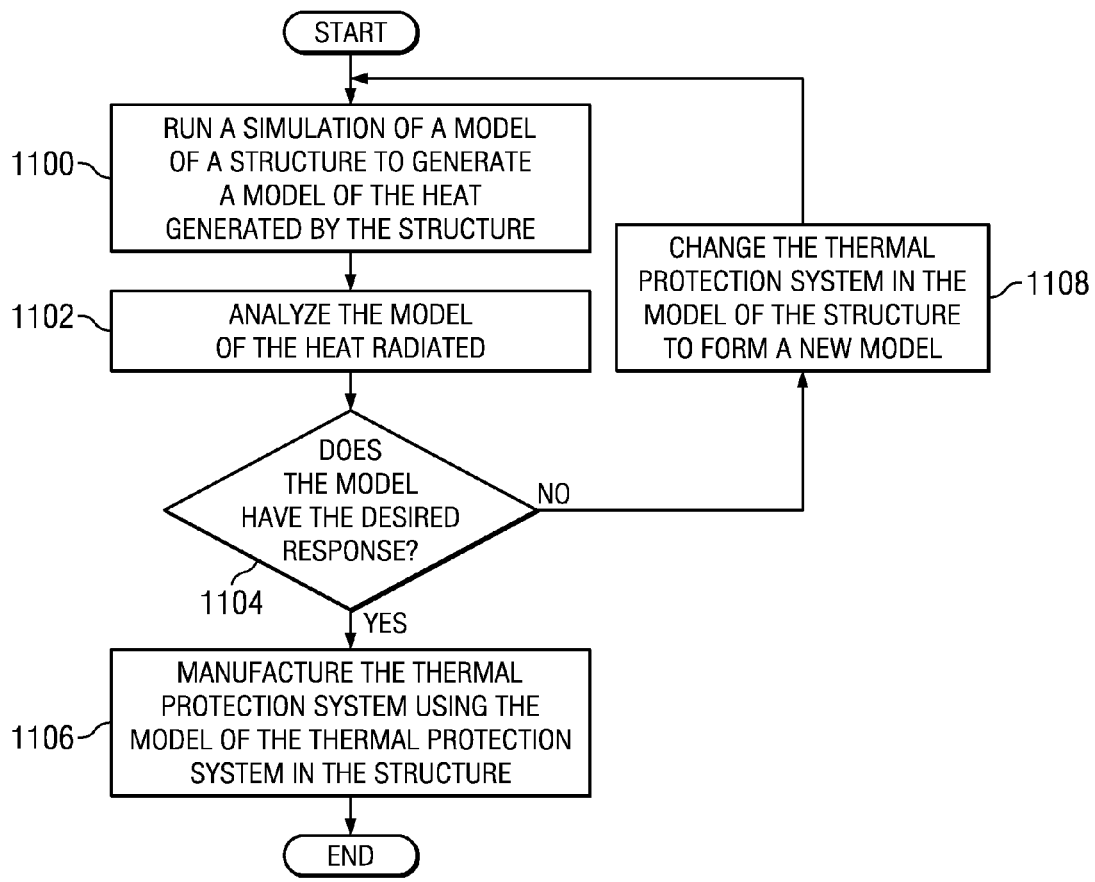
FIG. 11 is an illustration of a flowchart for manufacturing a thermal protection system in accordance with an advantageous embodiment.

With reference now to FIG. 11, an illustration of a flowchart for manufacturing a thermal protection system is depicted in accordance with an advantageous embodiment. In these illustrative examples, the process illustrated in FIG. 11 may be used to manufacture thermal protection system 329 for structure 304 in FIG. 3.

The process begins by running a simulation of a model of a structure to generate a model of the heat generated by the structure (operation 1100). In these examples, the structure may be, for example, a vehicle with a thermal protection system. Thereafter, the model of the heat radiated is analyzed (operation 1102).

A determination is made as to whether the model has the desired response (operation 1104). The analysis of the model may be used to determine whether the model has a desired response. The desired response may be whether the amount of heat radiated at certain locations meets a desired level. For example, a thermal protection system may absorb heat. As a result, a desired response of the model may be one in which the heat radiated is less than some selected level. In another example, a thermal protection system may reflect heat. In this type of thermal protection system, the desired response may be the radiation of heat at particular locations that are greater than a selected level.

If the model has a desired response, the thermal protection system is manufactured using the model of the thermal protection system in the structure (operation 1106), with the process terminating thereafter.

With reference again to operation 1104, if the model of the heat radiated does not have a desired response, the thermal protection system in the model of the structure is changed to form a new model (operation 1108), with the process then returning to operation 1100.

Additionally, this process also may be implemented in a data processing system in a vehicle to determine whether maintenance is needed for a thermal protection system while the vehicle is in operation. For example, the illustrative examples may be implemented in a spacecraft to determine whether tiles in a thermal protection system may need maintenance for re-entry. For example, if inconsistencies are found in tiles, a simulation of those inconsistencies may be run using the operations in FIGS. 10 and 11 to determine whether the current configuration of the thermal protection system with the inconsistencies meet desired levels of performance.

If the desired levels of performance are not present, then an identification of the types of repairs may be made. For example, the model of the structure with the thermal protection system may be modified to show replacements of some tiles that may have inconsistencies. This model may be re-read to determine whether the desired level of response in heat radiation occurs with the changes. In this manner, the different advantageous embodiments may be implemented in space vehicles as well as other vehicles in which thermal protection systems are present.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters, and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for modeling heat radiated by a structure, the method comprising:
    simulating a flow of a fluid over a surface of a model of the structure, wherein the surface has a plurality of surface elements;
    identifying the heat radiated by the plurality of surface elements in response to the fluid flowing over the surface of the model of the structure;
    identifying an effect of the heat radiated by at least a portion of the plurality of surface elements on each other; and
    creating a model of the heat radiated by the structure using the heat radiated by the plurality of surface elements and the effect of the heat radiated by the at least a portion of the plurality of surface elements on the each other.

2. The method of claim 1, wherein the step of identifying the heat radiated by the plurality of surface elements in response to the fluid flowing over the surface of the model comprises:
    identifying the heat radiated by the plurality of surface elements in response to the fluid flowing over the surface of the model using a selected temperature for an environment around the structure.

3. The method of claim 2, wherein the step of identifying the heat radiated by the plurality of surface elements in response to the fluid flowing over the surface of the model using the selected temperature for the environment around the structure is performed by identifying the heat for each of the plurality of surface elements as follows:

$$\dot{q} = \text{emissivity} * \sigma * (T_{wall}^4 - \text{selectedTemp}^4),$$

wherein $\dot{q}$ is the heat for the each of the plurality of surface elements, $\sigma$ is Boltzmann's constant, Twall is a temperature of the surface of the model, and selectedTemp is the selected temperature for the environment around the structure.

4. The method of claim 1, wherein the step of identifying the effect of the heat generated by the at least a portion of the plurality of surface elements on the each other comprises:
    identifying each surface element in the plurality of surface elements that exchanges the heat with another surface element in the plurality of surface elements to form the at least a portion of the plurality of surface elements; and
    identifying the heat exchanged between the at least a portion of the plurality of surface elements using a selected temperature for an environment around the structure.

5. The method of claim 4, wherein the step of identifying the heat exchanged between the at least a portion of the plurality of surface elements using the selected temperature for the environment around the structure is performed by identifying the heat exchanged between the each surface element and the another surface element as follows:

$$q_{ij} = F_{ij} * \text{emissivity} * \sigma * (T_{firstelement}^4 - T_{secondelement}^4)$$

wherein $q_{ij}$ is the heat exchanged between a first surface element and a second surface element in which the first surface element transfers the heat to the second surface element, $F_{ij}$ is a percentage of an area of the another surface element affected by the heat from the each surface element, $\sigma$ is Boltzmann's constant, $T_{firstelement}$ is a temperature of the first surface element, and $T_{secondelement}$ is a temperature of the second surface element.

6. The method of claim 5, wherein the heat radiated by the plurality of surface elements in response to the fluid flowing over the surface of the model is identified as follows:

$$Q = \Sigma q_{ij} + q_{background}$$

wherein Q is the heat radiated by the plurality of surface elements in response to the fluid flowing over the surface of the model and $q_{background}$ is the heat radiated by the environment around the structure in which $q_{background}$ is identified as follows:

$$q_{background} = (1 - \Sigma F_{ij}) * \text{emissivity} * \sigma * (T\text{wall}^4 - \text{selectedTemp}^4)$$

wherein Twall is a temperature of the surface of the model, and selectedTemp is the selected temperature for the environment around the structure.

7. The method of claim 1 further comprising:
    identifying a type of surface for each surface element in the plurality of surface elements.

8. The method of claim 1, wherein the fluid comprises at least one of air, water, a gas, and a liquid.

9. The method of claim 1, wherein the structure is selected from one of an aircraft, a portion of the aircraft, a wing, a tail, a fuselage, a spacecraft, and an automobile.

10. An apparatus comprising:
    a processor unit;
    a memory;
    a storage device; and
    first program code for simulating a flow of a fluid over a surface of a model of a vehicle, wherein the surface has a plurality of surface elements; second program code for identifying heat radiated by the plurality of surface elements in response to the fluid flowing over the surface of the model; third program code for identifying an effect of the heat radiated by a portion of the plurality of surface elements on each other; and fourth program code for creating a model of the heat radiated by the vehicle using the heat radiated by the plurality of surface elements and by the effect of the heat radiated by the portion of the plurality of surface elements on the each other, wherein the first program code, the second program code, the third program code, and the fourth program code are stored on the storage device for processing by the processor unit via the memory.

11. The apparatus of claim 10, wherein the second program code for identifying the heat radiated by the plurality of surface elements in response to the fluid flowing over the surface of the model comprises:
    fifth program code for identifying the heat radiated by the plurality of surface elements in response to the
fluid flowing over the surface of the model using a selected temperature for an environment around the structure.

12. The apparatus of claim 11, wherein the fifth program code for identifying the heat radiated by the plurality of surface elements in response to the fluid flowing over the surface of the model using the selected temperature for the environment around the structure comprises:

program code for identifying the heat for each of the plurality of surface elements as follows:

$$\dot{q}=\text{emissivity}*\sigma*(T_{wall}^4-\text{selectedTemp}^4),$$

wherein q̇ is the heat for the each of the plurality of surface elements, σ is Boltzmann's constant, Twall is a temperature of the surface of the model, and selectedTemp is the selected temperature for the environment around the structure.

13. The apparatus of claim 10, wherein the third program code for identifying the effect of the heat generated by at least a portion of the plurality of surface elements on the each other comprises:

fifth program code for identifying each surface element in the plurality of surface elements that exchanges the heat with another surface element in the plurality of surface elements to form the at least a portion of the plurality of surface elements; and sixth program code for identifying the heat exchanged between the at least a portion of the plurality of surface elements using a selected temperature for an environment around a structure.

14. The apparatus of claim 13, wherein the sixth program code for identifying the heat exchanged between the at least a portion of the plurality of surface elements using the selected temperature for the environment around the structure comprises:

program code for identifying the heat exchanged between the each surface element and the another surface element as follows:

$$q_{ij}=F_{ij}*\text{emissivity}*\sigma*(T_{firstelement}^4-T_{secondelement}^4)$$

wherein $q_{ij}$ is the heat exchanged between a first surface element and a second surface element in which the first surface element transfers the heat to the second surface element, $F_{ij}$ is a percentage of an area of the another surface element affected by the heat from the each surface element, σ is Boltzmann's constant, $T_{firstelement}$ is a temperature of the first surface element, and $T_{secondelement}$ is a temperature of the second surface element.

15. The apparatus of claim 14, wherein the heat radiated by the plurality of surface elements in response to the fluid flowing over the surface of the model is identified as follows:

$$Q=\Sigma q_{ij}+q_{background}$$

wherein Q is the heat radiated by the plurality of surface elements in response to the fluid flowing over the surface of the model and $q_{background}$ is the heat radiated by the environment around the structure in which $q_{background}$ is identified as follows:

$$q_{background}=(1-\Sigma F_{ij})*\text{emissivity}*\sigma*(T\text{wall}^4-\text{selectedTemp}^4)$$

wherein Twall is a temperature of the surface of the model, and selectedTemp is the selected temperature for the environment around the structure.

16. A computer program product comprising:
a computer readable storage medium;
program code, stored on the computer readable storage medium, for simulating a flow of a fluid over a surface of a model of a structure, wherein the surface has a plurality of surface elements;
program code, stored on the computer readable storage medium, for identifying heat radiated by the plurality of surface elements in response to the fluid flowing over the surface of the model of the structure;

program code, stored on the computer readable storage medium, for identifying an effect of the heat radiated by at least a portion of the plurality of surface elements on each other; and program code, stored on the computer readable storage medium, for creating a model of the heat radiated by the structure using the heat radiated by the plurality of surface elements and the effect of the heat radiated by the at least a portion of the plurality of surface elements on the each other.

17. The computer program product of claim 16, wherein the program code, stored on the computer readable storage medium, for identifying the heat radiated by the plurality of surface elements in response to the fluid flowing over the surface of the model comprises:

program code, stored on the computer readable storage medium, for identifying the heat radiated by the plurality of surface elements in response to the fluid flowing over the surface of the model using a selected temperature for an environment around the structure.

18. The computer program product of claim 17, wherein the program code, stored on the computer readable storage medium, for identifying the heat radiated by the plurality of surface elements in response to the fluid flowing over the surface of the model using the selected temperature for the environment around the structure comprises:

program code, stored on the computer readable storage medium, for identifying the heat for each of the plurality of surface elements as follows:

$$\dot{q}=\text{emissivity}*\sigma*(T\text{wall}^4-\text{selectedTemp}^4),$$

wherein q̇ is the heat for the each of the plurality of surface elements, σ is Boltzmann's constant, Twall is a temperature of the surface of the model, and selectedTemp is the selected temperature for the environment around the structure.

19. The computer program product of claim 16, wherein the program code, stored on the computer readable storage medium, for identifying the effect of the heat generated by the at least a portion of the plurality of surface elements on the each other comprises:

program code, stored on the computer readable storage medium, for identifying each surface element in the plurality of surface elements that exchanges the heat with another surface element in the plurality of surface elements to form the at least a portion of the plurality of surface elements; and program code, stored on the computer readable storage medium, for identifying the heat exchanged between the at least a portion of the plurality of surface elements using a selected temperature for an environment around the structure.

20. The computer program product of claim 19, wherein the program code, stored on the computer readable storage medium, for identifying the heat exchanged between the at least a portion of the plurality of surface elements using the selected temperature for the environment around the structure comprises:

program code, stored on the computer readable storage medium, for identifying the heat exchanged between the each surface element and the another surface element as follows:

$$q_{ij}=F_{ij}*\text{emissivity}*\sigma*(T_{firstelement}^4-T_{secondelement}^4)$$

wherein $q_{ij}$ is the heat exchanged between a first surface element and a second surface element in which the first surface element transfers the heat to the second surface element, $F_{ij}$ is a percentage of an area of the another surface element affected by the heat from the each surface element, σ is Boltzmann's constant, $T_{firstelement}$ is a temperature of the first surface element, and $T_{secondelement}$ is a temperature of the second surface element.

21. The computer program product of claim 20, wherein the heat radiated by the plurality of surface elements in response to the fluid flowing over the surface of the model is identified as follows:

$$Q=\Sigma q_{ij}+q_{background}$$

wherein Q is the heat radiated by the plurality of surface elements in response to the fluid flowing over the surface of the model and $q_{background}$ is the heat radiated by the environment around the structure in which $q_{background}$ is identified as follows:

$$q_{background}=(1-\Sigma F_{ij})*\text{emissivity}*\sigma*(T\text{wall}^4-\text{selectedTemp}^4)$$

wherein Twall is a temperature of the surface of the model, and selectedTemp is the selected temperature for the environment around the structure.

22. A method for manufacturing a thermal protection system, the method comprising:
    simulating a flow of a fluid over a surface of a model of a structure, wherein the surface has a plurality of surface elements, wherein the structure comprises the thermal protection system;
    identifying heat radiated by the plurality of surface elements in response to the fluid flowing over the surface of the model of the structure;
    identifying an effect of the heat radiated by at least a portion of the plurality of surface elements on each other;
    creating a model of the heat radiated by the structure using the heat radiated by the plurality of surface elements and the effect of the heat radiated by the at least a portion of the plurality of surface elements on the each other;
    determining whether the model of the thermal protection system has a desired response using the model of the heat radiated by the structure; and
    responsive to a determination that the model of the thermal protection system has the desired response, manufacturing the thermal protection system from the model of the structure.

23. The method of claim 22 further comprising:
    responsive to an absence of the determination that the model of the thermal protection system has the desired response, changing the thermal protection system in the model to form a new model of the structure;
    repeating the steps of simulating the flow of the fluid over the surface of the model of the structure, wherein the surface has the plurality of surface elements, wherein the structure includes the thermal protection system; identifying the heat radiated by the plurality of surface elements in response to the fluid flowing over the surface of the model of the structure; identifying the effect of the heat radiated by the at least the portion of the plurality of surface elements on the each other; creating the model of the heat radiated by the structure using the heat radiated by the plurality of surface elements and the effect of the heat radiated by the at least the portion of the plurality of surface elements on the each other; and determining whether the model of the thermal protection system has the desired response using the model of the heat radiated by the structure using the new model of the structure.

24. The method of claim 22, wherein the step of identifying the heat radiated by the plurality of surface elements in response to the fluid flowing over the surface of the model comprises:
    identifying the heat radiated by the plurality of surface elements in response to the fluid flowing over the surface of the model using a selected temperature for an environment around the structure.

25. The method of claim 24, wherein the step of identifying the heat radiated by the plurality of surface elements in response to the fluid flowing over the surface of the model using the selected temperature for the environment around the structure is performed by identifying the heat for each of the plurality of surface elements as follows:

$$\dot{q}=\text{emissivity}*\sigma*(T_{wall}^4-\text{selectedTemp}^4),$$

wherein $\dot{q}$ is the heat for the each of the plurality of surface elements, σ is Boltzmann's constant, Twall is a temperature of the surface of the model, and selectedTemp is the selected temperature for the environment around the structure.

26. The method of claim 22, wherein the step of identifying the effect of the heat radiated by the at least a portion of the plurality of surface elements on the each other comprises:
    identifying each surface element in the plurality of surface elements that exchanges the heat with another surface element in the plurality of surface elements to form the at least a portion of the plurality of surface elements; and
    identifying the heat exchanged between the at least a portion of the plurality of surface elements using a selected temperature for an environment around the structure.

27. The method of claim 26, wherein the step of identifying the heat exchanged between the at least a portion of the plurality of surface elements using the selected temperature for the environment around the structure is performed by identifying the heat exchanged between the each surface element and the another surface element as follows:

$$q_{ij}=F_{ij}*\text{emissivity}*\sigma*(T_{firstelement}^4-T_{secondelement}^4)$$

wherein $q_{ij}$ is the heat exchanged between a first surface element and a second surface element in which the first surface element transfers the heat to the second surface element, $F_{ij}$ is a percentage of an area of the another surface element affected by the heat from the each surface element, σ is Boltzmann's constant, $T_{firstelement}$ is a temperature of the first surface element, and $T_{secondelement}$ is a temperature of the second surface element.

28. The method of claim 27, wherein the heat radiated by the plurality of surface elements in response to the fluid flowing over the surface of the model is identified as follows:

$$Q=\Sigma q_{ij}+q_{background}$$

wherein Q is the heat radiated by the plurality of surface elements in response to the fluid flowing over the surface of the model and $q_{background}$ is the heat radiated by the environment around the structure in which $q_{background}$ is identified as follows:

$$q_{background}=(1-\Sigma F_{ij})*\text{emissivity}*\sigma*(T\text{wall}^4-\text{selectedTemp}^4)$$

wherein Twall is a temperature of the surface of the model, and selectedTemp is the selected temperature for the environment around the structure.

29. The method of claim 22 further comprising:
    identifying a type of surface for each surface element in the plurality of surface elements.

30. The method of claim 22, wherein the structure further comprises a vehicle in which the thermal protection system is used.

31. An apparatus for identifying maintenance for a thermal protection system, the apparatus comprising:
  a processor unit configured to simulate a flow of a fluid over a surface of a model of a vehicle with the thermal protection system, wherein the surface has a plurality of surface elements; identify heat radiated by the plurality of surface elements in response to the fluid flowing over the surface of the model; identify an effect of the heat radiated by a portion of the plurality of surface elements on each other; create a model of the heat radiated by the vehicle using the heat radiated by the plurality of surface elements and by the effect of the heat radiated by the portion of the plurality of surface elements on the each other; determine whether the model of the heat radiated by the thermal protection system has a desired response; and identify the maintenance for the thermal protection system if the model does not have the desired response.

32. The apparatus of claim 31, wherein in identifying the effect of the heat radiated by at least a portion of the plurality of surface elements on the each other, the processor unit is configured to identify each surface element in the plurality of surface elements that exchanges the heat with another surface element in the plurality of surface elements to form the at least a portion of the plurality of surface elements and identify the heat exchanged between the at least a portion of the plurality of surface elements using a selected temperature for an environment around the structure.

33. The apparatus of claim 32, wherein the processor unit is configured to identify the heat exchanged between the at least a portion of the plurality of surface elements using the selected temperature for the environment around the structure is performed by identifying the heat exchanged between the each surface element and the another surface element as follows:

$$q_{ij} = F_{ij} * \text{emissivity} * \sigma * (T_{firstelement}^4 - T_{secondelement}^4)$$

wherein $q_{ij}$ is the heat exchanged between a first surface element and a second surface element in which the first surface element transfers the heat to the second surface element, $F_{ij}$ is a percentage of an area of the another surface element affected by the heat from the each surface element, $\sigma$ is Boltzmann's constant, $T_{firstelement}$ is a temperature of the first surface element, and $T_{secondelement}$ is a temperature of the second surface element.

34. The apparatus of claim 33, wherein the heat radiated by the plurality of surface elements in response to the fluid flowing over the surface of the model is identified as follows:

$$Q = \Sigma q_{ij} + q_{background}$$

wherein Q is the heat radiated by the plurality of surface elements in response to the fluid flowing over the surface of the model and $q_{background}$ is the heat radiated by the environment around the structure in which $q_{background}$ is identified as follows:

$$q_{background} = (1 - \Sigma F_{ij}) * \text{emissivity} * \sigma * (T\text{wall}^4 - \text{selectedTemp}^4)$$

wherein Twall is a temperature of the surface of the model, and selectedTemp is the selected temperature for the environment around the structure.

* * * * *